US006537331B1

(12) United States Patent
Siemensmeyer et al.

(10) Patent No.: US 6,537,331 B1
(45) Date of Patent: Mar. 25, 2003

(54) DYE PREPARATIONS CONTAINING AZO DYES

(75) Inventors: Karl Siemensmeyer, Frankenthal (DE); Bernd Siegel, Otterstadt (DE); Volker Bach, Neustadt (DE); Manfred Herrmann, Ludwigshafen (DE); Günther König, Maxdorf (DE); Rüdiger Sens, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/555,765

(22) PCT Filed: Nov. 21, 1998

(86) PCT No.: PCT/EP98/07499

§ 371 (c)(1),
(2), (4) Date: Jun. 5, 2000

(87) PCT Pub. No.: WO99/29783

PCT Pub. Date: Jun. 17, 1999

(30) Foreign Application Priority Data

Dec. 5, 1997 (DE) .......................... 197 54 025

(51) Int. Cl.$^7$ .................. C09B 67/40; C09D 11/00; D06P 5/28; D06P 5/30
(52) U.S. Cl. .................. 8/471; 8/445; 8/466; 8/552; 8/557; 8/560; 8/576; 8/613; 8/611; 8/662; 8/687; 8/561
(58) Field of Search .................. 8/552, 557, 560, 8/576, 611, 613, 662, 687, 561, 471, 466, 467, 445; 106/31.33, 31.36, 31.4, 31.51, 31.02, 31.58

(56) References Cited

U.S. PATENT DOCUMENTS

| 2,979,528 | A |   | 4/1961  | Lundsted         |
| 4,218,218 | A |   | 8/1980  | Daubach et al.   |
| 4,249,902 | A | * | 2/1981  | Kruckenbeg et al.|
| 4,505,857 | A |   | 3/1985  | Egli             |
| 4,843,153 | A |   | 6/1989  | Eilingsfeld et al.|
| 4,940,469 | A | * | 7/1990  | Mockel et al.    |
| 5,186,846 | A |   | 2/1993  | Brueckmann et al.|
| 5,264,507 | A |   | 11/1993 | Wiesenfeldt et al.|
| 5,603,735 | A | * | 2/1997  | Zimin, Sr.       |
| 6,123,740 | A | * | 9/2000  | Sens et al.      |
| 6,332,943 | B1| * | 12/2001 | Herrmann et al.  |

FOREIGN PATENT DOCUMENTS

| DE | 27 24 951 | 12/1978 |
| DE | 29 40 292 | 5/1980  |
| DE | 29 47 005 | 6/1981  |
| DE | 31 08 077 | 1/1982  |
| DE | 36 41 677 | 6/1988  |
| EP | 0 037 798 | 10/1981 |
| EP | 0 201 896 | 11/1986 |
| EP | 0 328 485 | 8/1989  |
| EP | 0 535 490 | 4/1993  |
| EP | 0 554 153 | 6/1993  |
| EP | 0 625 552 | 11/1994 |
| EP | 0 655 527 | 5/1995  |
| EP | 0 735 109 | 10/1996 |
| GB | 201896    | 10/1924 |
| GB | 544153    | 3/1942  |
| GB | 1 546 803 | 5/1979  |

OTHER PUBLICATIONS

K. Venkataraman, The Chemistry of Synthetic Dyes, vol. 6, "Reactive Dyes", 1972 (Table of Contents Only).
Ullman's Encyclopedia of Industrial Chemistry, vol. A1, pps. 107–112, "Acetylene," 1985.
B. Smith, et al., Text. Chem. Color, vol. 19, No. 8, pps. 23–29, "Ink Jet Printing for Textiles," Aug. 1987.
L.A. Graham, Text Chem. Color, vol. 21, No. 6, pps. 27–32, "Ink Jet Systems for Dyeing and Printing of Textiles," 1989.

* cited by examiner

*Primary Examiner*—Margaret Einsmann
(74) *Attorney, Agent, or Firm*—Oblon, Spivak, McClelland, Maier & Neustadt, P.C.

(57) ABSTRACT

Dye preparations comprising, based in each case on the weight of the preparation, from 0.1 to 30% by weight of one or more dyes from the class of the mono- or polyazo dyes containing no acidic groups, from 0.1 to 20% by weight of a dispersant based on an arylsulfonic acid-formaldehyde condensate or from 0.1 to 20% by weight of a water-soluble dispersant based on alkoxylated phenols with or without water, and their use as inks in the inkjet process and for textile sublimation transfer printing.

13 Claims, No Drawings

DYE PREPARATIONS CONTAINING AZO DYES

The present invention relates to novel dye preparations comprising, based in each case on the weight of the preparation, from 0.1 to 30% by weight of one or more dyes from the class of the mono- or polyazo dyes containing no acidic groups, from 0.1 to 20% by weight of a dispersant based on an arylsulfonic acid-formaldehyde condensate or from 0.1 to 20% by weight of a water-soluble dispersant based on alkoxylated phenols with or without water, and to their use as inks in the inkjet process and for textile sublimation transfer printing.

EP-A-655 527 has already disclosed dye preparations comprising disperse dyes and specific dispersants.

It is an object of the present invention to provide novel dye preparations comprising mono- or polyazo dyes. These novel dye preparations should advantageously be suitable for use in the inkjet process and in textile sublimation transfer printing.

We have found that this object is achieved by the dye preparations detailed at the outset.

Suitable mono- or polyazo dyes are known per se and are described in large numbers in, for example, K. Venkataraman "The Chemistry of Synthetic Dyes", Vol. VI, Academic Press, New York, London, 1972.

Of particular importance are azo dyes, especially monoazo dyes, having a diazo component which is derived from an aniline or from a five-membered aromatic heterocyclic amine having from one to three heteroatoms selected from the group consisting of nitrogen, oxygen and sulfur in the heterocyclic ring and can be fused with a benzene, thiophene, pyridine or pyrimidine ring.

Examples of important monoazo dyes are those whose diazo component is derived, for example, from an aniline or from a heterocyclic amine from the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzisothiazole, pyridothiophene, pyrimidothiophene, thienothiophene or thienothiazole series.

Particular mention may be made of those diazo components which originate from an aniline or from a heterocyclic amine from the pyrrole, thiophene, pyrazole, thiazole, isothiazole, triazole, thiadiazole, benzothiophene, benzothiazole, benzisothiazole, pyridothiophene, pyrimidothiophene, thienothiophene or thienothiazole series.

Also of importance are azo dyes, especially monoazo dyes, having a coupling component from the aniline, aminonaphthalene, aminothiazole, diaminopyridine or hydroxypyridone series.

Particularly important monoazo dyes are of the formula I $$D-N=N-K \qquad (I),$$

where

D is a radical of the formula

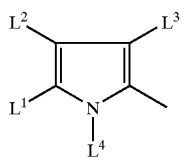 (IIa)

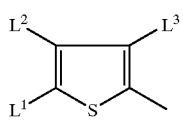 (IIb)

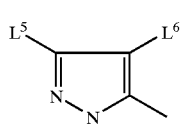 (IIc)

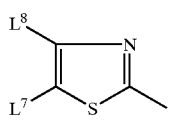 (IId)

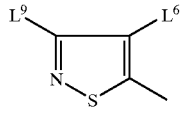 (IIe)

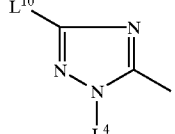 (IIf)

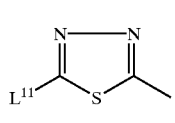 (IIg)

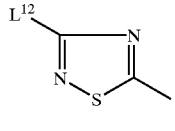 (IIh)

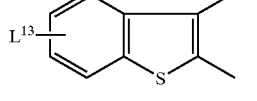 (IIi)

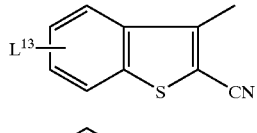 (IIj)

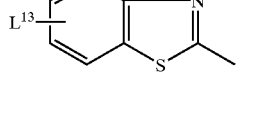 (IIk)

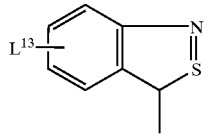 (IIl)

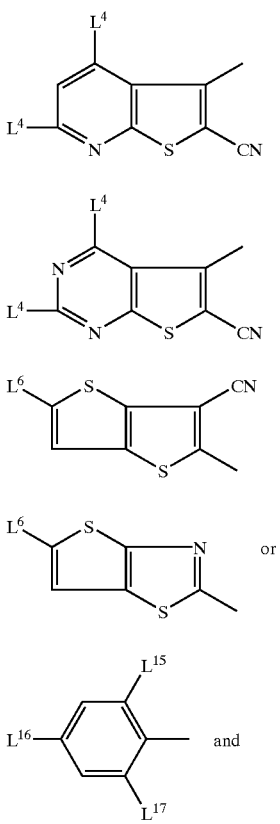

K is a radical of the formula

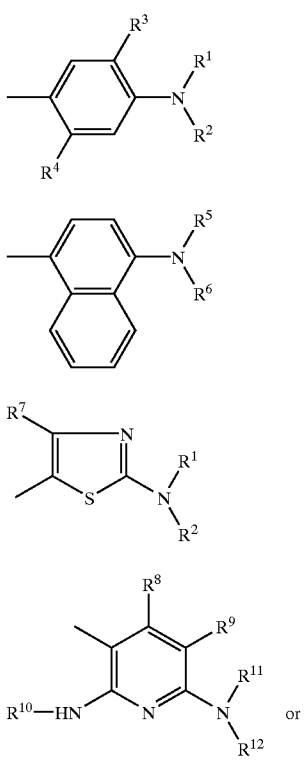

-continued (IIId)

in which
L¹ is nitro, cyano, $C_1$–$C_6$-alkanoyl, benzoyl, $C_1$–$C_6$-alkylsulfonyl, unsubstituted or substituted phenylsulfonyl or a radical of the formula —CH═T, where T is hydroxyimino, $C_1$–$C_4$-alkoxyimino or the radical of a CH-acidic compound, L² is hydrogen, $C_1$–$C_6$-alkyl, halogen, hydroxyl, mercapto, unsubstituted, phenyl-substituted or $C_1$–$C_4$-alkoxy-substituted $C_1$–$C_6$-alkoxy, unsubstituted or substituted phenoxy, unsubstituted or phenyl-substituted $C_1$–$C_6$-alkylthio, unsubstituted or substituted phenylthio, $C_1$–$C_6$-alkylsulfonyl or unsubstituted or substituted phenylsulfonyl, L³ is cyano, $C_1$–$C_4$-alkoxycarbonyl or nitro, L⁴ is hydrogen, $C_1$–$C_6$-alkyl or phenyl, L⁵ is $C_1$–$C_6$-alkyl or phenyl, L⁶ is hydrogen, cyano, $C_1$–$C_4$-alkoxycarbonyl, $C_1$–$C_6$-alkanoyl, thiocyanato or halogen, L⁷ is nitro, cyano, $C_1$–$C_6$-alkanoyl, benzoyl, $C_1$–$C_4$-alkoxycarbonyl, $C_1$–$C_6$-alkylsulfonyl, unsubstituted or substituted phenylsulfonyl or a radical of the formula —CH═T, in which T is as defined above, L⁸ is hydrogen, $C_1$–$C_6$-alkyl, cyano, halogen, unsubstituted, phenyl-substituted or $C_1$–$C_4$-alkoxy-substituted $C_1$–$C_6$-alkoxy, unsubstituted or phenyl-substituted $C_1$–$C_6$-alkylthio, unsubstituted or substituted phenylthio, $C_1$–$C_6$-alkylsulfonyl, unsubstituted or substituted phenylsulfonyl or $C_1$–$C_4$-alkoxycarbonyl, L⁹ is cyano, unsubstituted or phenyl-substituted $C_1$–$C_6$-alkyl, unsubstituted or phenyl-substituted $C_1$–$C_6$-alkylthio, unsubstituted or substituted phenyl, thienyl, $C_1$–$C_4$-alkylthienyl, pyridyl or $C_1$–$C_4$-alkylpyridyl, L¹⁰ is phenyl or pyridyl, L¹¹ is trifluoromethyl, nitro, $C_1$–$C_6$-alkyl, phenyl, unsubstituted or phenyl-substituted $C_1$–$C_6$-alkylthio or $C_1$–$C_6$-dialkylamino, L¹² is $C_1$–$C_6$-alkyl, phenyl, 2-cyanoethylthio or 2-($C_1$–$C_4$-alkoxycarbonyl)ethylthio, L¹³ is hydrogen, nitro or halogen, L¹⁴ is hydrogen, cyano, $C_1$–$C_4$-alkoxycarbonyl, nitro or halogen, L¹⁵, L¹⁶ and L¹⁷ are identical or different and independently of one another are each hydrogen, $C_1$–$C_6$-alkyl, $C_1$–$C_6$-alkoxy, halogen, nitro, cyano, $C_1$–$C_4$-alkoxycarbonyl, $C_1$–$C_6$-alkylsulfonyl or unsubstituted or substituted phenylsulfonyl, R¹ and R² are identical or different and independently of one another are each hydrogen, unsubstituted or substituted $C_1$–$C_6$-alkyl, which may be interrupted by 1 or 2 oxygen atoms in ether function, $C_5$–$C_7$-cycloalkyl or $C_3$–$C_6$-alkenyl, R³ is hydrogen, $C_1$–$C_6$-alkyl or $C_1$–$C_6$-alkoxy, R⁴ is hydrogen, $C_1$–$C_6$-alkyl, $C_1$–$C_6$-alkoxy, $C_1$–$C_6$-alkylsulfonylamino, unsubstituted or substituted $C_1$–$C_6$-alkanoylamino or benzoylamino, $R^5$ and $R^6$ are identical or different and independently of one another are each hydrogen or $C_1$–$C_6$-alkyl, $R^7$ is hydrogen, unsubstituted or substituted phenyl or thienyl, $R^8$ is hydrogen or $C_1$–$C_6$-alkyl, $R^9$ is cyano, carbamoyl or acetyl, $R^{10}$, $R^{11}$ and $R^{12}$ are identical or different and independently of one another are each unsubstituted or substituted $C_1$–$C_{12}$-alkyl which may be interrupted by 1 to 3 oxygen atoms in ether function, $C_5$–$C_7$-cycloalkyl, unsubstituted or substituted phenyl, $C_3$–$C_6$-alkenyl, unsubstituted or substituted benzoyl, $C_1$–$C_8$-alkanoyl, $C_1$–$C_6$-alkylsulfonyl or unsubstituted or substituted phenylsulfonyl or $R^{11}$ and $R^{12}$ together with the nitrogen atom connecting them are a 5- or 6-membered saturated heterocyclic radical with or without further heteroatoms, and $R^{13}$ is hydrogen or $C_1$–$C_6$-alkyl.

Also of particular importance are disazo dyes of the formula IVa or IVb

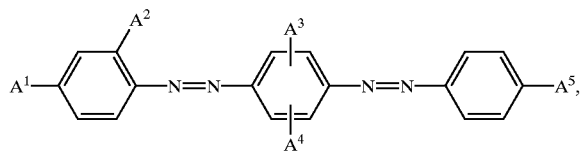

(IVa)

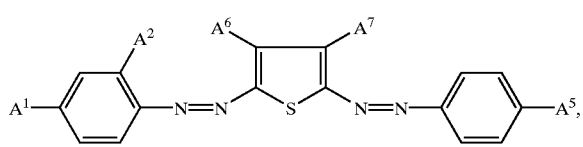

(IVb)

where $A^1$ is hydrogen, $C_1$–$C_6$-alkyl, $C_1$–$C_6$-alkoxy or nitro, $A^2$ is hydrogen or cyano $A^3$ and $A^4$ are identical or different and independently of one another are each hydrogen, $C_1$–$C_6$-alkyl or $C_1$–$C_6$-alkoxy, $A^5$ are hydrogen, hydroxyl, $C_1$–$C_6$-alkoxy, amino or unsubstituted or cyano-substituted $C_1$–$C_6$-mono- or dialkylamino, $A^6$ is hydrogen, methyl or chlorine, and $A^7$ is cyano or $C_1$–$C_4$-alkoxycarbonyl.

All of the alkyl or alkenyl groups appearing in the above formulae can be either straight-chain or branched.

Where substituted phenyl groups appear in the above formulae possible examples of suitable substituents are $C_1$–$C_4$-alkyl, chlorine, bromine, nitro or $C_1$–$C_4$-alkoxy. Such phenyl radicals generally have 1 to 3 substituents.

Where substituted alkyl groups appear in the above formulae possible examples of suitable substituents are, unless indicated otherwise, hydroxyl, cyclohexyloxy, phenoxy, $C_1$–$C_4$-alkoxycarbonyl, $C_1$–$C_4$-alkanoyloxy, cyano, cyclohexyl or phenyl. Such alkyl radicals generally have 1 or 2 substituents.

Radicals $L^2$, $L^4$, $L^5$, $L^8$, $L^9$, $L^{11}$, $L^{12}$, $L^{15}$, $L^{16}$, $L^{17}$, $R^1$, $R^2$, $R^3$, $R^4$, $R^5$, $R^6$, $R^8$, $R_{10}$, $R_{11}$, $R^{12}$, $R^{13}$, $A^1$, $A^3$ and $A^4$ are for example methyl, ethyl, propyl, isopropyl, butyl, isobutyl, sec-butyl, pentyl, isopentyl, neopentyl, tert-pentyl, hexyl or 2-methylpentyl.

Radicals $L^9$ are also for example benzyl or 1- or 2-phenylethyl.

Radicals $L^2$, $L^8$, $L^9$ and $L^{11}$ are also for example methylthio, ethylthio, propylthio, isopropylthio, butylthio, isobutylthio, pentylthio, hexylthio, benzylthio or 1- or 2-phenylethylthio.

Radicals $L^2$ and $L^8$ are also for example phenylthio, 2-methylphenylthio, 2-methoxyphenylthio or 2-chlorophenylthio.

Radicals $A^5$, and also radicals of $L^2$, $L^8$, $L^{15}$, $L^{16}$, $L^{17}$, $R^3$, $R^4$, $A^1$, $A^3$ and $A^4$, are for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

Radicals $L^6$, and also radicals $L^2$, $L^8$, $L^{13}$, $L^{14}$, $L^{15}$, $L^{16}$ and $L^{17}$, are for example fluorine, chlorine or bromine.

Radicals $L^7$, and also radicals $L^1$, $L^2$, $L^8$, $L^{15}$, $L^{16}$, $L^{17}$, $R_{10}$, $R^{11}$ and $R^{12}$, are for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

Radicals $L^3$ and $A^7$, and also radicals $L^6$, $L^7$, $L^8$, $L^{14}$, $L^{15}$, $L^{16}$ and $L^{17}$, are for example methoxycarbonyl, ethoxycarbonyl, propoxycarbonyl, isopropoxycarbonyl, butoxycarbonyl, isobutoxycarbonyl or sec-butoxycarbonyl.

Radicals $L^2$ and $L^8$ are also for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

Radicals $A^5$ are also for example methylamino, ethylamino, propylamino, isopropylamino, butylamino, pentylamino, hexylamino, 2-cyanoethylamino or bis(2-cyanoethyl)amino.

Radicals $L^{11}$ and $A^5$ are also for example dimethylamino, diethylamino, dipropylamino, diisopropylamino, dibutylamino, dipentylamino, dihexylamino or N-methyl-N-ethylamino.

Radicals $L^{12}$ are also for example 2-methoxycarbonylethylthio or 2-ethoxycarbonylethylthio.

Radicals $R^1$, $R^2$, $R_{11}$, $R^{12}$ and $R^{13}$ are also for example cyclopentyl, cyclohexyl or cycloheptyl.

Radicals $L^9$ are also for example phenyl, 2-, 3- or 4-methylphenyl, 2,4-dimethylphenyl, 2-, 3- or 4-methoxyphenyl, 2-, 3- or 4-chlorophenyl, 2-, 3- or 4-methoxyphenyl, 2- or 3-methylthienyl or 2-, 3- or 4-methylpyridyl.

Radicals $L^1$, $L^6$ and $L^7$ are also for example formyl, acetyl, propionyl, butyryl, pentanoyl or hexanoyl.

If $L^1$ or $L^7$ are —CH=T in which T derives from a CH-acidic compound $H_2T$, possible examples of such CH-acidic compounds $H_2T$ are those of the formula

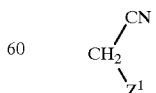

(Va)

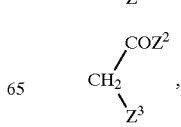

(Vb)

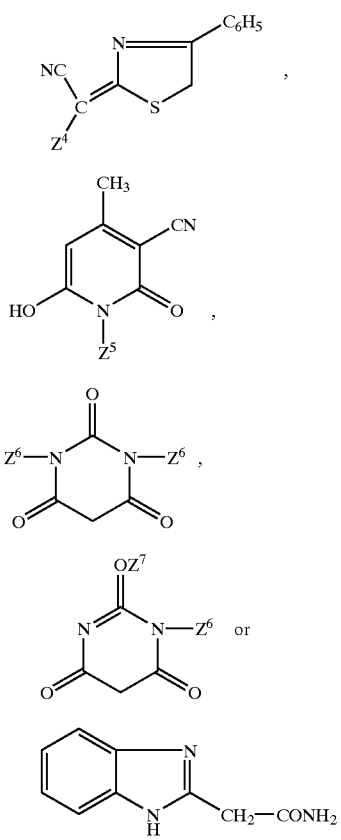

where
- $Z^1$ is cyano, nitro, $C_1$–$C_4$-alkanoyl, unsubstituted or substituted benzoyl, $C_1$–$C_4$-alkylsulfonyl, unsubstituted or substituted phenylsulfonyl, carboxyl, $C_1$–$C_4$-alkoxycarbonyl, $C_3$–$C_4$-alkenyloxycarbonyl, phenoxycarbonyl, carbamoyl, $C_1$–$C_4$-mono- or dialkylcarbamoyl, unsubstituted or substituted phenylcarbamoyl, unsubstituted or substituted phenyl, benzothiazol-2-yl, benzimidazol-2-yl, 5-phenyl-1,3,4-thiadiazol-2-yl or 2-hydroxylquinoxalin-3-yl,
- $Z^2$ is $C_1$–$C_4$-alkyl, $C_1$–$C_4$-alkoxy or $C_3$–$C_4$-alkenyloxy,
- $Z^3$ is $C_1$–$C_4$-alkoxycarbonyl, $C_3$–$C_4$-alkenyloxycarbonyl, phenylcarbamoyl or benzimidazol-2-yl,
- $Z^4$ is cyano, $C_1$–$C_4$-alkoxycarbonyl or $C_3$–$C_4$-alkenyloxycarbonyl,
- $Z^5$ is hydrogen or $C_1$–$C_6$-alkyl,
- $Z^6$ is hydrogen, $C_1$–$C_4$-alkyl or phenyl and
- $Z^7$ is $C_1$–$C_4$-alkyl.

Here, emphasis is to be given to the radical derived from the compounds of the formula Va, Vb or Vc in which $Z^1$ is cyano, $C_1$–$C_4$-alkanoyl, $C_1$–$C_4$-alkoxycarbonyl or $C_3$–$C_4$-alkenyloxycarbonyl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl or $C_3$–$C_4$-alkenyloxycarbonyl und $Z^4$ is cyano.

Particular emphasis here is to be given to the radical derived from compounds of the formula Va, Vb or Vc in which $Z^1$ is cyano, $C_1$–$C_4$-alkoxycarbonyl or $C_3$–$C_4$-alkenyloxycarbonyl, $Z^2$ is $C_1$–$C_4$-alkoxy or $C_2$–$C_4$-alkenyloxy, $Z^3$ is $C_1$–$C_4$-alkoxycarbonyl or $C_3$–$C_4$-alkenyloxycarbonyl and $Z^4$ is cyano.

Radicals $R^{10}$, $R^{11}$ and $R^{12}$ are also for example heptyl, octyl, 2-ethylhexyl, nonyl, decyl, undecyl, dodecyl, 4,7-dioxanonyl, 4,8-dioxadecyl, 4,6-dioxaundecyl, 3,6,9-trioxaundecyl, 4,7,10-trioxaundecyl or 4,7,10-trioxadodecyl.

Radicals $R^1$, $R^2$, $R^{10}$, $R^{11}$ and $R^{12}$ are also for example 2-methoxyethyl, 2-ethoxyethyl, 2-propoxyethyl, 2-butoxyethyl, 2-isobutoxyethyl, 2- or 3-methoxypropyl, 1-methoxyprop-2-yl, 2- or 3-ethoxypropyl or 2- or 3-propoxypropyl, 3,6-dioxaheptyl, 3,6-dioxaoctyl, 4,7-dioxaoctyl, 2-hydroxyethyl, 3-hydroxypropyl, 4-hydroxybutyl, 2-cyclohexyloxyethyl, 2- or 3-cyclohexyloxypropyl, 2- or 4-cyclohexyloxybutyl, 2-phenoxyethyl, 2-phenoxypropyl, 3-phenoxypropyl, 4-phenoxybutyl, 2-methoxycarbonylethyl, 2-ethoxycarbonylethyl, 2- or 3-methoxycarbonylpropyl, 2- or 3-ethoxycarbonylpropyl, 2- or 3-butoxycarbonylpropyl, 4-methoxycarbonylbutyl, 4-ethoxycarbonylbutyl, 2-cyanoethyl, 2- or 3-cyanopropyl, 4-cyanobutyl, 2-cyclohexylalkyl, 2- or 3-cyclohexylpropyl, benzyl, 1- or 2-phenylethyl, 2-acetyloxyethyl, 2-propionyloxyethyl, 2- or 3-acetyloxypropyl, prop-2-en-1-yl, 2-methylprop-2-en-1-yl, but-2-en-1-yl or but-3-en-1-yl.

If the radicals $R^{11}$ and $R^{12}$ together with the nitrogen atom connecting them are a five- or six-membered saturated heterocyclic radical with or without further heteroatoms, then examples of such a radical are suitably pyrrolidinyl, piperidyl, morpholinyl, thiomorpholinyl, thiomorpholinyl-S,S-dioxide, piperazinyl or N-($C_1$–$C_4$-alkyl)piperazinyl, such as N-methyl- or N-ethylpiperazinyl.

Radicals $R^{10}$, $R^{11}$ and $R^{12}$ are also for example formyl, acetyl, propionyl, butyryl, isobutyryl, pentanoyl, hexanoyl, heptanoyl, octanoyl, 2-ethylhexanoyl, benzoyl, 2-, 3- or 4-methylbenzoyl, 2-, 3- or 4-methoxybenzoyl or 2-, 3- or 4-chlorobenzoyl.

Of particular interest are mono azodyes of the formula I in which D is a radical of the formula IIq and K is a radical of the formula IIIa.

Particular preference is given to azo dyes of the formula VI

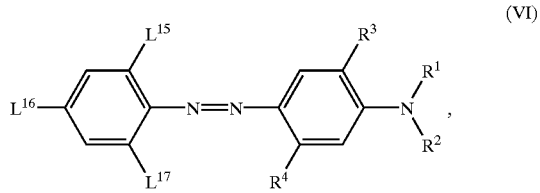

where
- $L^{15}$ and $L^{17}$ are each cyano,
- $L^{16}$ is $C_1$–$C_6$-alkyl,
- $R^1$ and $R^2$ are each $C_1$–$C_6$-alkyl,
- $R^3$ is hydrogen, $C_1$–$C_6$-alkyl or $C_1$–$C_6$-alkoxy and
- $R^4$ is hydrogen, $C_1$–$C_6$-alkyl or $C_1$–$C_6$-alkanoylamino.

As already mentioned at the outset, the azo dyes are known per se and are described, for example, in Venkataraman (loc. cit.), or in EP-A-201 896, DE-A-3 108 077, U.S. Pat. No. 4,843,153, GB-A-1 546 803, EP-A-535 490 or EP-A-544 153 or can be obtained by the methods referred to in said documents.

Preferred dye preparations are those in which 99% of the particles of dye present in the preparation are smaller than 1 μm.

As a dispersant it is preferred to use an arylsulfonic acid formaldehyde condensate containing from 3 to 50% by weight, based on the weight of the dispersant, of one or more aromatic or long-chain aliphatic carboxylic acids, their salts, their anhydrides, or a mixture thereof.

Arylsulfonic acid-formaldehyde condensates used are in particular those containing not more than 40% by weight of sulfonic acid groups.

A particularly suitable starting material for the arylsulfonic acids is a mixture of those aromatic compounds which are obtainable by thermal cracking of a naphthenic residual oil and fractionation of the cracking products. The naphthenic residual oils are obtained, for example, in the cracking of light gasoline. In DE-A-2 947 005, for example, they are referred to as high-boiling aromatic hydrocarbon oils. The naphthenic residual oil is preferably subjected to thermal cracking at from 1400 to 1700° C. The cracking products are then subjected to fractional distillation. The fraction which passes over at from 100 to 120° C. under atmospheric pressure (1013 mbar) is collected and supplied as the aromatic compound for sulfonation. Such a fraction is commonly obtained as a byproduct in the known acetylene oil quench process (Ullmann's Encyclopedia of Industrial Chemistry, VCH Verlagsgesellschaft mbH, Weinheim, 1985, Volume A1, pages 107 to 112).

This aromatics fraction consists of a mixture of numerous aromatic substances whose structure and quantity it is virtually impossible to determine individually. The following aryl compounds are the principal representatives of this aromatics fraction:

|  | % by wt. in the aromatics fraction |
| --- | --- |
| Naphthalene | 30–55 |
| 2-Methylnaphthalene | 5–15 |
| 1-Methylnaphthalene | 4–10 |
| Indene | 3–10 |
| Biphenyl | 1–5 |
| Methylindene | 1–5 |
| Acenaphthene | 1–4 |

The aromatics fraction also includes the following identified aryl constituents in amounts of from 0.1 to about 2% by weight: fluorene, indane, methylstyrene, phenanthrene, methylindane, dimethylnaphthalene, ethylnaphthalene, xylenes, tetralin, styrene, methylethylbenzene, anthracene, fluoranthrene, pyrene, acenaphthylene and toluene.

Particularly suitable arylsulfonic acids generally include α- and β-naphthalenesulfonic acids, the ratio of the α- to the β-isomers being from 20:1 to 1:8, in particular 10:1 to 1:5.

Examples of suitable aromatic carboxylic acids or their derivatives are naphthalenecarboxylic, naphthalic, terephthalic, isophthalic, benzoic, trimellitic, phenylacetic, phenoxyacetic, salicylic, p-hydroxybenzoic, diphenylacetic, m-hydroxybenzoic and benzenetetracarboxylic acids and the acid anhydrides, such as phthalic anhydride, trimellitic anhydride, benzene-1,2,4,5-tetracarboxylic dianhydride or naphthalic anhydride.

Particularly suitable long-chain aliphatic carboxylic acids are saturated or olefinically unsaturated, linear or branched aliphatic monocarboxylic acids having 8 to 22, preferably 8 to 18, carbon atoms and of natural or synthetic origin, examples being higher fatty acids, such as caprylic, capric, lauric, myristic, palmitic, stearic, oleic, linoleic or linolenic acid, or synthetic carboxylic acids such as 2-ethylhexanoic, isononanoic or isotridecanoic acid.

It is also possible to use mixtures of anhydrides, mixtures of carboxylic acids, mixtures of salts of the contemplated carboxylic acids and also mixtures of carboxylic acids and anhydrides. Suitable salts of said carboxylic acids are the alkali metal, ammonium or alkaline earth metal salts, which are obtainable, for example, by neutralizing these carboxylic acids with sodium hydroxide, potassium hydroxide, lithium hydroxide, sodium carbonate, magnesium carbonate, calcium oxide, calcium hydroxide, ammonia or alkanolamines, such as ethanolamine, diethanolamine or triethanolamine.

With partiuclar preference, sodium benzoate, sodium phenylacetate., sodium salicylate, sodium 4-hydroxybenzoate, sodium terephthalate, sodium 2-hydroxy-3-naphthalenecarboxylate, naphthalene-1-carboxylic acid, phthalic anhydride or benzoic acid are used in the dispersants.

In the dye preparations of the invention use is made preferably of those dispersants comprising A) from 50 to 97% by weight, in particular from 70 to 95% by weight, of one or more arylsulfonic acid-formaldehyde condensates, and B) from 3 to 50% by weight, in particular from 5 to 30% by weight, of one or more aromatic or long-chain aliphatic carboxylic acids, their salts or their anhydrides, or a mixture thereof.

The arylsulfonic acid-formaldehyde condensates employed as dispersants in accordance with the invention are products which are known per se and are described, for example, in U.S. Pat. No. 5,186,846.

As water-soluble dispersants based on alkoxylated phenols use is made preferably of those of the formula VII or VIII

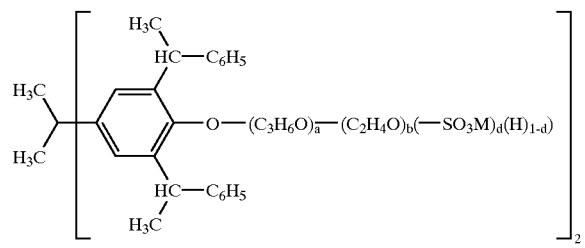

(VII)

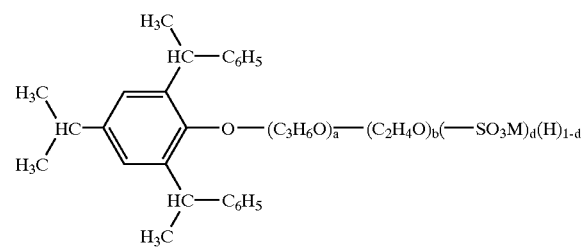

(VIII)

where

M is an alkali metal, a is from 0 to on average 125, b is on average from 37 to 250, and if b>37 the ratio b:a is at least 1:1, and d is 0 or 1, or mixtures thereof.

The products of the formulae VII and VIII are prepared by reacting the phenol derivatives of the formula IX or X

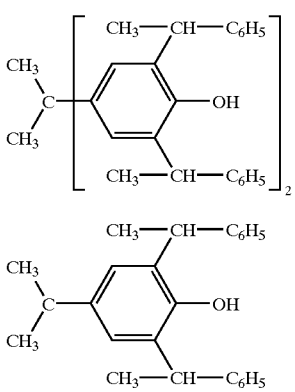

with propylene oxide and then reacting the adduct with ethylene oxide or by reacting IX and/or X with ethylene oxide. If desired, the adducts are reacted fully or partly with chlorosulfonic acid or sulfur trioxide to form sulfuric monoesters, and the resultant monoesters are neutralized with alkalis.

The phenols of the formula IX and X are obtained by reacting phenol or 2,2-(p,p'-bishydroxydiphenyl)propane with 3 or 4 mol of styrene in the presence of acid as catalyst. The phenols IX and X are reacted by known techniques first with ethylene oxide, or only with ethylene oxide, in the presence of acidic or alkaline catalysts to form the corresponding alkoxylation products VII and VIII where d=0. Alkoxylation can be carried out, for example, by the process described in U.S. Pat. No. 2,979,528. Where b is >37 the quotient $$\frac{b}{a} \text{ must be} > 1.$$

The sulfuric monoesters are prepared by reacting the alkoxylation products with chlorosulfonic acid or sulfur trioxide, it being possible to choose the quantity such that all of the free hydroxyls or only some of them are sulfated. In the latter case mixtures of compounds of the formulae VII and VIII are formed which contain free and sulfated hydroxyl groups. For use as dispersants, the sulfuric monoesters obtained in the reaction are converted into water-soluble salts. Suitable such salts are advantageously the alkali metal salts, such as the sodium or potassium salts, for example. This conversion requires two equivalents of basic compounds in the case of chlorosulfonic acid and one equivalent in the case of sulfur trioxide. As such basic compounds it is judicious to use aqueous alkali metal hydroxide. In the course of neutralization the temperature should not exceed 70° C. The resulting salts can be isolated in the form of aqueous solutions or as the actual salts and can be used in solid form.

Preference is given to dye preparations with dispersants in which a is from 0 to on average 2.5, b is on average from 37 to 250 and d is from 0 to on average 0.5. Very particular preference is given to preparations with compositions in which a is from 0 to on average 2.5, b is on average from 50 to 100 and d is on average 0.5.

The abovementioned dispersants are compounds which are known per se from, for example U.S. Pat. No. 4,218,218.

Preference is given to dye preparations containing, based in each case on their weight, from 1 to 15% by weight of one or more azo dyes and from 0.5 to 10% by weight of dispersant(s).

Preference is also given to dye preparations additionally containing, based on their weight, from 0.1 to 30% by weight, preferably from 0.1 to 25% by weight of a carbohydrate and from 0.1 to 20% by weight, preferably from 0.1 to 15% by weight of a polyalkylene glycol.

Examples of suitable carbohydrates which may be present in the dye preparations of the invention are sorbitol and glucose.

Suitable polyalkylene glycols which may be present in the dye preparations of the invention are, in particular, polyethylene glycols or polypropylene glycols having an average molecular weight, for example, of from 100 to 1000, preferably from 100 to 600 and, in particular, about 400. If desired, ethylene oxide-propylene oxide copolymers may also be employed.

Preference is given, furthermore, to dye preparations additionally containing, based on their weight, from 10 to 90% by weight, preferably from 10 to 70% by weight, of a mono- or polyhydric alcohol or mixtures thereof.

Suitable mono- or polyhydric alcohols are generally alkanemono- or -polyols, especially polyols having from 2 to 8 carbon atoms, preferably 2 to 6 carbon atoms and up to 4, preferably up to 3, alcoholic hydroxyl groups. Examples which may be mentioned are ethane-1,2-diol, propane-1,2-diol, propane-1,3-diol, glycerol, pentane-1,2,5-triol or hexane-1,2,6-triol.

Examples of further possible constituents of the dye preparations of the invention are auxiliaries, such as preservatives, antioxidants, foam inhibitors or viscosity regulators. These agents are known per se and are customary in commerce. If these agents are present in the dye preparations of the invention, their overall amount is generally 1% by weight or less, based on the weight of the preparation.

Preferred dye preparations may also employ surfactants for reducing the surface tension and for improving the wetting behavior within the ink head.

Preferred dye preparations include surfactants based on ethoxylated or propoxylated fatty alcohols or oxo alcohols, propylene oxide-ethylene oxide block copolymers, ethoxylates of oleic acid or alkylphenols, alkylphenol ether sulfates, alkyl polyglycosides, alkyl phosphonates, alkyl phenyl phosphonates, alkyl phosphates, alkyl phenyl phosphates or alkynediols.

The sum of the constituents in the dye preparations of the invention is of course in each case 100% by weight. Where the sum of the constituents of the dye preparations of the invention results in a value of less than 100% by weight, the remainder is generally water.

The dye preparations of the invention normally have a viscosity of from 1 to 15 mm$^2$/s, preferably from 2 to 8 mm$^2$/s.

The surface tension of the dye preparations of the invention is generally from 30 to 70 mN/m, preferably from 30 to 60 mN/m.

The pH of the dye preparations of the invention is generally from 2 to 11, preferably from 6 to 19.

The novel dye preparations are prepared by a conventional route. For instance the dye, in the form for example of a presscake, can be mixed with the dispersant and, if desired, polyalkylene glycol in the presence of water and the resultant mixture predispersed in an appropriate apparatus. The mixture which then results can be treated in a mill in order to establish the desired size of the dye particles. Lastly, final adjustment can be made by adding appropriate amounts of water, any polyalkylene glycol, mono- or polyhydric alcohol and/or carbohydrates, with or without further auxiliaries, and passing the resulting formulation, after it has been mixed, through a sieve having a pore size of preferably 1 µm.

The dye preparations of the invention are suitable advantageously as inks in the inkjet process and for textile sublimation transfer printing.

In the inkjet (printing) process it is common to use aqueous inks which are sprayed in small droplets directly onto the substrate. A distinction is made here between a continuous process, in which the ink is pressed uniformly through a nozzle and guided onto the substrate by means of an electric field as a function of the pattern to be printed, and an interrupted inkjet or drop-on-demand process, in which the ink is expelled only where a colored dot is to appear. The latter form of the process employs a piezoelectric crystal or a heated hollow needle (bubble or thermal jet process) to exert pressure on the ink system and so eject an ink droplet. These techniques are described in Text. Chem. Color, Volume 19 (8), pages 23 to 29, 1987, and Volume 21 (6), pages 27 to 32, 1989.

The dye preparations of the invention are particularly suitable as inks for the bubble jet process or for the process using a piezoelectric crystal.

Suitable substrates for the inkjet process include not only paper but also the substrate materials set out below.

In sublimation transfer printing, a pattern is initially preformed on a transfer and then transferred by means of heat to a substrate. The dye can be fixed not only in the course of the transfer process itself but also in a subsequent fixation and aftertreatment operation. This process is common knowledge and is described for example, in Ullmann's Encyclopedia of Industrial Chemistry, 5th Edition, Volume A26, pages 499 to 501.

Suitable substrates include, in particular, textile materials, for example, fibers, yarns, threads, knits, wovens or nonwovens composed of polyester, modified polyester, e.g., anionically modified polyester, blends of polyester with cellulose, cotton, viscose or wool, polyamide, polyacrylonitrile, triacetate, acetate, polycarbonate, polypropylene or polyvinyl chloride, polyester microfibers or else polymer-coated substrates, such as metal foils, glass or ceramic.

The novel dye preparations are notable for not causing inkjet nozzle blockages. Furthermore, their use leads to stripe-free prints.

The examples which follow illustrate the invention.

The following dyes were used

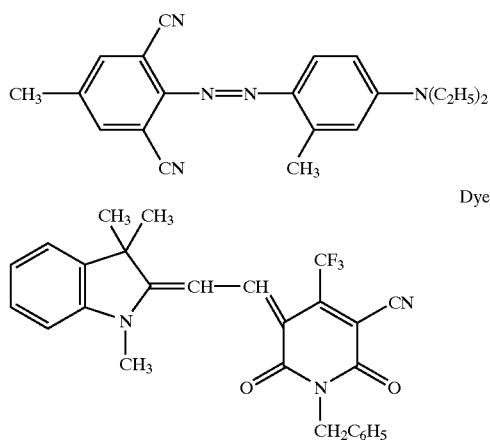

Dye No. 1

Dye No. 2

Dispersants

As the dispersant based on an arylsulfonic acid-formaldehyde condensate a product was used which additionally contains benzoic acid and is described in U.S. Pat. No. 5,186,846 as Example 3 (Dispersant 1).

Also employed as a dispersant was a water-soluble dispersant based on alkoxylated phenols, which is described in U.S. Pat. No. 4,218,218 as Example 13 (Dispersant 2).

Preparing the Dye Preparation (Procedure 1)

15 g of dye, 15 g of polyethylene glycol (average molecular weight: 400), 7.5 g of dispersant, 0.37 g of 50% strength by weight aqueous glutaraldehyde solution and 0.75 g of 47% strength by weight aqueous tetramethylolacetylenediurea solution are made up with water to a total weight of 100 g and converted into a paste in a mill. Thereafter the pH is adjusted to 8.5 with 10% strength by weight sodium hydroxide solution.

The mixture is then milled in a stirred ball mill so that 99% of the dye particles have a size of less than 1 μm.

For final adjustment, 26.7 g of millbase are admixed with a further 4 g of polyethylene glycol (see above), 0.1 g of 50% strength by weight aqueous glutaraldehyde solution, 0.3 g of 47% strength by weight aqueous tetramethylolacetylenediurea solution and 20 g of 70% strength by weight aqueous sorbitol solution, made up with water to a total weight of 100 g and filtered through a sieve having a pore size of 1 μm.

The dye preparations listed in Table 1 below were obtained (the percentages are by weight in each case).

TABLE 1

| | Preparation No. | | |
|---|---|---|---|
| | 1 | 2 | 3 |
| Dye No. 1 | 4% | 4% | |
| Dye No. 2 | | | 4% |
| Dispersant 1 | 2% | | 2% |
| Dispersant 2 | | 2% | |
| Polyethylene glycol | 8% | 8% | 8% |
| 70% strength aqueous sorbitol solution | 20% | 20% | 20% |
| 50% strength aqueous glutaraldehyde solution | 0.2% | 0.2% | 0.2% |
| 4% strength aqueous tetramethylolacetyleneurea | 0.5% | 0.5% | 0.5% |
| Fully deminineralized water | 65.3% | 65.3% | 65.3% |
| Total | 100% | 100% | 100% |

The dye preparations have the physical and printing properties set out in Table 2 below.

TABLE 2

| | Preparation No. | | |
|---|---|---|---|
| | 1 | 2 | 3 |
| Surface tension [mN/m] | 55.2 | 56.3 | 48.8 |
| Viscosity [mm²/s] | 4.2 | 4.1 | |
| Particle size distribution [μm] × 50 | 220 | 220 | |
| Particle size distribution [μm] after aging a) × 50 | 225 | 225 | |
| Droplet weight [ng] 10 million droplets minimum/maximum | 132/141 | 127/138 | 65/68 |
| Dispersion factor | >99 | >99 | |

Test Methods and Evaluations

1) Surface tension

The surface tension was measured with a Krüss K 10 digital tensiometer. The values reported in Table 2 are the average of 3 measurements.

2) Viscosity

The viscosity was determined by the Ubbelohde method (DIN 51662).

3) Particle size determination

The particle size distribution was measured with an Alcatel CILAS HR 850 granulometer.

4) Aging stability

The aging stability of the preparations (inks) was investigated as follows:

A freezing/heating treatment cycle (4 h freezing of the inks at −20° C. and subsequent heat treatment for 4 h at 70° C.). This temperature cycle was repeated 4 times in each case.

After the aging test, the particle size distribution of the aged inks was redetermined using the CILAS method.

5) Cogation test

The behavior of the inks in the nozzles during the printing process is of particular importance. The following test examines the tendency of the inks to form deposits and blockages in the nozzles.

A modified Desk Jet Plus (bubble jet printer) from Hewlett-Packard was used as the test equipment.

First, the average droplet weight was determined as a function of the voltage applied to the nozzles. 1 million pulses were then sent to each nozzle at constant voltage and thereafter the average droplet weight of a defined number of droplets was predetermined. This operation was repeated 10 times in total.

With an ideal ink, the average droplet weight should remain constant over the test period.

The change in the droplet weight of the individual inks is shown in Table 2.

6) Dispersion factor 100 ml of the appropriate ink was stored for 7 days at room temperature in a graduated cylinder. Then 10 ml of the dispersion were removed from the base of the cylinder and 10 ml from the surface, and the color strength of each aliquot was determined by photometry.

The dispersion factor is calculated from the color strength of the upper dispersion/color strength of the lower dispersion×100=dispersion factor.

Similarly favorable results are obtained with the dyes set out in Table 3 below.

TABLE 3

| Dye No. | |
|---|---|
| 3 | (structure: 3-nitrophenyl-N=N-4-hydroxy-1-methylquinolin-2(1H)-one) |
| 4 | (structure: 5-methyl-2-hydroxyphenyl-N=N-4-(NH—COCH$_3$)phenyl) |
| 5 | (structure: phenyl-N=N-phenyl-N=N-4-hydroxyquinolin-2(1H)-one) |
| 6 | (structure: 4-nitro-2-chlorophenyl-N=N-[3-(NH—COCH$_3$)-4-N(C$_2$H$_4$OCOCH$_3$)$_2$]phenyl) |
| 7 | (structure: 4-nitro-2-cyanophenyl-N=N-4-N(C$_2$H$_5$)(C$_2$H$_4$CN)phenyl) |

TABLE 3-continued

Dye No.

8 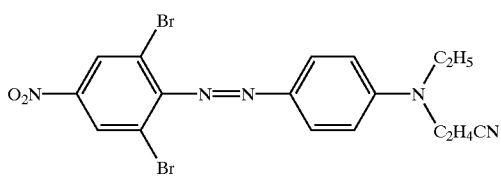

9 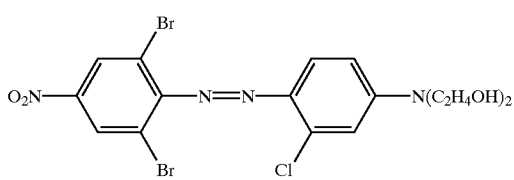

10 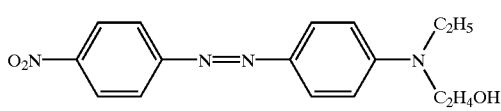

11 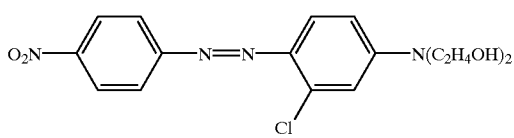

12 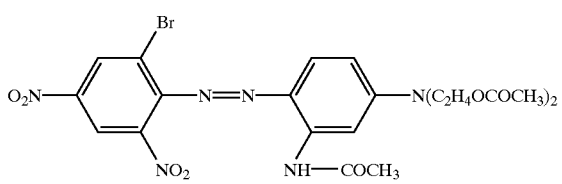

13 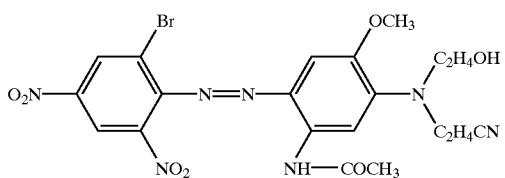

14 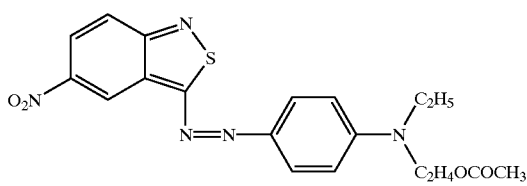

15 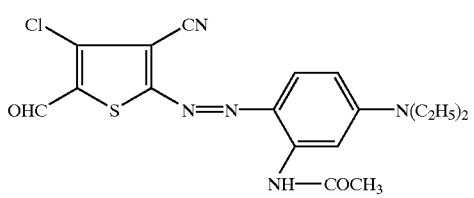

We claim:
1. A dye preparation, comprising, based in each case on the weight of the preparation:
   from 1 to 15% by weight of one or more dyes from the class of the mono- or polyazo dyes containing no acidic groups,
   from 0.1 to 20% by weight of a water-soluble dispersant based on alkoxylated phenols with or without water,
   from 0.1 to 30% by weight of a carbohydrate, and
   from 0.1 to 20% by weight of a polyalkylene glycol.

2. The dye preparation according to claim 1, wherein the dispersant is at least one alkoxylated phenol of formula (VII):

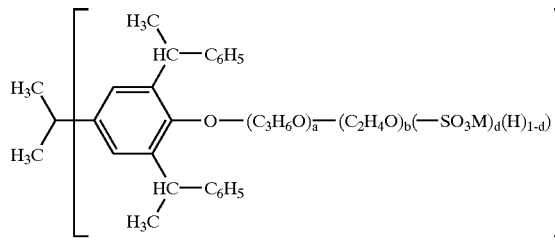

(VII)

wherein
M is an alkali metal,
a is from 0 to 125 on average,
b is from 37 to 250 on average, and
d is 0 or 1.

3. An inkjet process, comprising
ejecting a droplet comprising the dye preparation according to claim 2 onto a substrate with a piezoelectric crystal or a heated hollow needle.

4. The dye preparation according to claim 1, further comprising, based on the weight of the preparation, from 10 to 90% by weight of a mono- or polyhydric alcohol or mixture thereof.

5. The dye preparation according to claim 1, comprising dye particles wherein 99% of the dye particles are smaller than 1 μm.

6. The dye preparation according to claim 1, comprising azo dyes having a diazo component which is derived from an aniline or from a five-membered aromatic heterocyclic amine having from one to three heteroatoms selected from the group consisting of nitrogen, oxygen and sulfur in the heterocyclic ring and possibly being fused with a benzene, thiophene, pyridine or pyrimidine ring.

7. The dye preparation according to claim 1, comprising azo dyes having a coupling component from the aniline, aminonaphthalene, aminothiazole, diaminopyridine or hydroxypyridone series.

8. A textile sublimation transfer printing process, comprising
pre-forming the dye preparation according to claim 2 onto a transfer; and
transferring the dye preparation to a substrate.

9. The dye preparation according to claim 1, wherein the dispersant is at least one alkoxylated phenol of formula (VIII):

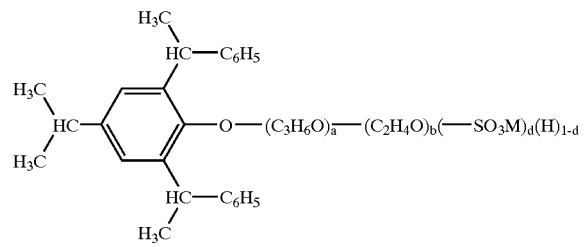

(VIII)

wherein
M is an alkali metal,
a is from 0 to 125 on average,
b is from 37 to 250 on average, and
d is 0 or 1.

10. An inkjet process, comprising
ejecting a droplet comprising the dye preparation according to claim 9 onto a substrate with a piezoelectric crystal or a heated hollow needle.

11. A textile sublimation transfer printing process, comprising
pre-forming the dye preparation according to claim 9 onto a transfer; and
transferring the dye preparation to a substrate.

12. An inkjet process, comprising
ejecting droplets comprising a dye preparation, comprising, based in each case on the weight of the preparation:
from 1 to 15% by weight of one or more dyes from the class of the mono- or polyazo dyes containing no acidic groups,
from 0.1 to 20% by weight of a dispersant based on an arylsulfonic acid-formaldehyde condensate and containing from 3 to 50% by weight, based on the weight of the dispersant, of one or more aromatic or long-chain aliphatic carboxylic acids, salts thereof, anhydrides thereof or a mixture thereof, or from 0.1 to 20% by weight of a water-soluble dispersant based on alkoxylated phenols with or without water,
from 0.1 to 30% by weight of a carbohydrate, and
from 0.1 to 20% by weight of a polyalkylene glycol, onto a substrate with a piezoelectric crystal or a heated hollow needle.

13. A textile sublimation transfer printing process, comprising
pre-forming a dye preparation, comprising, based in each case on the weight of the preparation:
from 1 to 15% by weight of one or more dyes from the class of the mono- or polyazo dyes containing no acidic groups,
from 0.1 to 20% by weight of a dispersant based on an arylsulfonic acid-formaldehyde condensate and containing from 3 to 50% by weight, based on the weight of the dispersant, of one or more aromatic or long-chain aliphatic carboxylic acids, salts thereof, anhydrides thereof or a mixture thereof, or from 0.1 to 20% by weight of a water-soluble dispersant based on alkoxylated phenols with or without water,
from 0.1 to 30% by weight of a carbohydrate, and
from 0.1 to 20% by weight of a polyalkylene glycol, onto a transfer; and
transferring the dye preparation to a substrate.

* * * * *